(12) United States Patent
Flanagan

(10) Patent No.: US 10,015,091 B2
(45) Date of Patent: Jul. 3, 2018

(54) METHOD OF LOW-BANDWIDTH DATA TRANSPORT

(71) Applicant: William A. Flanagan, Oakton, VA (US)

(72) Inventor: William A. Flanagan, Oakton, VA (US)

( * ) Notice: Subject to any disclaimer, the term of this patent is extended or adjusted under 35 U.S.C. 154(b) by 0 days.

(21) Appl. No.: 15/615,875

(22) Filed: Jun. 7, 2017

(65) Prior Publication Data
US 2017/0359258 A1 Dec. 14, 2017

Related U.S. Application Data

(60) Provisional application No. 62/348,306, filed on Jun. 10, 2016.

(51) Int. Cl.
| | |
|---|---|
| G06F 15/173 | (2006.01) |
| H04L 12/741 | (2013.01) |
| H04L 12/723 | (2013.01) |
| H04L 29/06 | (2006.01) |
| H04L 12/805 | (2013.01) |
| H04L 29/12 | (2006.01) |
| H04L 12/721 | (2013.01) |
| H04L 12/46 | (2006.01) |
| H04L 12/781 | (2013.01) |

(52) U.S. Cl.
CPC .......... *H04L 45/74* (2013.01); *H04L 12/4641* (2013.01); *H04L 45/12* (2013.01); *H04L 45/507* (2013.01); *H04L 45/52* (2013.01); *H04L 47/36* (2013.01); *H04L 61/10* (2013.01); *H04L 69/08* (2013.01)

(58) Field of Classification Search
USPC ........................................................ 709/238
See application file for complete search history.

(56) References Cited

U.S. PATENT DOCUMENTS

| | | | |
|---|---|---|---|
| 6,041,054 A | 3/2000 | Westberg | |
| 6,301,229 B1 | 10/2001 | Araujo et al. | |
| 8,325,737 B2 | 12/2012 | Caviglia et al. | |
| 8,949,467 B1 * | 2/2015 | Flanagan | H04L 69/04 |
| | | | 709/247 |
| 9,602,636 B1 | 3/2017 | Vincent et al. | |
| 2003/0137971 A1 | 7/2003 | Gibson et al. | |
| 2006/0117110 A1 * | 6/2006 | Vasseur | H04L 45/00 |
| | | | 709/232 |
| 2007/0002850 A1 * | 1/2007 | Guichard | H04L 45/50 |
| | | | 370/389 |
| 2015/0055623 A1 | 2/2015 | Li et al. | |

\* cited by examiner

*Primary Examiner* — Hee Soo Kim
(74) *Attorney, Agent, or Firm* — Louis Ventre, Jr.

(57) ABSTRACT

A method is disclosed for more efficiently and economically transporting data on a network using network access links between the first switch, which is the entry point of the network, and an end-user device, which is either on a fixed link on a customer premises or is a mobile device. The method includes terminating one or more protocol sessions at the first switch and removing corresponding packet headers. The first switch creates a substitute packet, adding a substitute header that identifies the transport path and the communications connection. Removed headers are not delivered to the end-user device which processes received substitute packets into usable streams based on the substitute header.

18 Claims, 4 Drawing Sheets

METHOD OF LOW-BANDWIDTH DATA TRANSPORT

TECHNICAL FIELD

In the field of multiplex communications, a method is disclosed for organizing information to be switched over a plurality of nodes where one or more bytes of the information is preceded by an identification information indicative of a source or destination station.

BACKGROUND ART

Virtual circuits are the basis of Frame Relay service and appear in router networks as Multi-Protocol Label Switching (MPLS) label switched paths (LSPs).

A Label Switched Path is defined by entries in flow tables that direct arriving frames to their next onward destination. The Label need be unique only on a link; a value may be used by another connection on a different link. The Label on a packet may be changed by a switch during a forwarding operation.

Multi-Protocol Label Switching and Label Switched Paths have been contained within a carrier network. The "customer" never sees a label, only standard Internet Protocol (IP) and related headers. The size of standard headers make them significant consumers of bandwidth. Various forms of header compression exist and apply mostly on one link, though there are proposals (not yet usable in practice) to apply header compression end-to-end over a Label Switched Path.

SUMMARY OF INVENTION

A method is disclosed for more efficiently and economically transporting data on a network. The method includes providing network access links that include a plurality of switches where a first switch receives a first packet from a first end-user device via an Internet Protocol session. The first packet has a first header that includes an Internet Protocol header with an Internet Protocol address. The first switch terminates the Internet Protocol session and removes the Internet Protocol header from the first packet. The first switch then matches the first packet with flow-path data in a flow-table, which yields a physical path containing a transport route from the first switch to the second end-user device. The first switch then generates a substitute packet containing information from the first packet less the Internet Protocol header that was removed. The substitute packet further contains a path identifier that is an instruction on how to route the substitute packet on the physical path in the plurality of switches to the second end-user device. The substitute packet further contains a connection identifier that identifies multiple communications sessions that share the physical path from the first switch through the plurality of switches to the second end-user device. Finally, the substitute packet includes control information on how to coordinate joint operation of the first switch and the second end-user device. The method next includes a step of transmitting the substitute packet, preferably in a frame that includes a Layer Two protocol such as Ethernet, along the physical path through the plurality of switches to the second end-user device. This then causes the second end-user device to terminate the physical path for the substitute packet, match the connection identifier of the substitute packet to a communications session, and process the substitute packet into a usable stream. The usable stream is formed to exclude the Internet Protocol header previously removed from the first packet.

Optional steps in the method include receiving a usable data stream comprising a plurality of packets; requiring the usable data stream to include one or more of an audio stream, a video stream, and application data to be delivered to an application.

Optional steps further include requiring the transport route to be a virtual circuit involving a Multi-Protocol Label Switched (MPLS) path, an Ethernet subnet, a Frame Relay data link connection, or an Asynchronous Transfer Mode (ATM) virtual path.

Optional steps further include requiring the first packet to include a second header with a transport-layer protocol header. Then, terminating a transport-layer protocol session and deleting the second header when generating the substitute packet.

Optional steps further include requiring the first packet to include additional headers representing higher-level protocols, and then terminating each protocol session corresponding to the one or more additional headers and removing at the first switch the one or more additional headers prior to generating the substitute packet.

Optional steps further include requiring the first packet to include a payload of information and then transmitting the payload of information to the second end-user device with the substitute packet.

Optional steps further include receiving a frame at any switch in the plurality of switches; and enabling each switch in the plurality of switches to match the frame with flow-path data in the flow-table. When the frame has been received, then when any of the plurality of switches fails to match the frame with flow-path data in the flow-table either discarding the frame and/or sending an error message to the first switch.

Optional steps further include broadcasting a query seeking a flow-path to the second end-user device when any of the plurality of switches fails to match the first packet, or the substitute packet, with flow-path data. The broadcast is made to a connected device, such as a router, a host, a switch, and/or a controller.

Optional steps further include enabling a connection of the second end-user device to one of the switches in the plurality of switches. The connection may include an optical cable, an electrical cable, and a radio link.

Optional steps further include receiving at the first switch a transmission originating from a second end-user device. The transmission includes a path identifier and a connection identifier and the transmission includes a header format defined in the substitute packet. Then, matching the transmission from the second end-user device with second flow-path data in the flow-table, the second flow-path data comprising a transport route from the first switch to the first end-user device. Then, identifying an off-network device outside of the plurality of switches, specifically the first end-user device. The second flow-path data includes a transport route from the first switch to the first end-user device. Then, generating a second packet at the first switch. The second packet includes information from the transmission received from the second end-user device. Then, adding to the second packet an Internet-Protocol-address header that participates in the Internet Protocol session terminated at the first switch after receiving the first packet from the first end-user device and adding a header for each higher-level protocol terminated from the first packet, each said header participating in a terminated session. Then, sending the second packet out of the plurality of switches to an end-user device, specifically the first end-user device. The first end-user device being a terminal, a host, a router, and/or a bridge.

An optional step includes limiting the connection identifier to one of a Multi-Protocol Label Switched (MPLS) network Label, an Ethernet header, a Frame Relay Data Link Connection Identifier, and an Asynchronous Transfer Mode (ATM) network Virtual Path Identifier.

An alternative embodiment includes a step of providing network access links comprising a plurality of switches, the plurality of switches comprising a first switch, which in this embodiment is exemplified by a router. This alternative embodiment further includes steps of: receiving a first packet at the first switch, the first packet comprising data, the data comprising a plurality of packet headers, the plurality of packet headers comprising a network-layer protocol, the network-layer protocol comprising an Internet Protocol address; creating a reduced data packet by terminating a higher-level protocol at the first switch and removing from the first packet at least one packet header in the plurality of packet headers other than the network-layer protocol comprising the Internet Protocol address; generating a substitute packet at the first switch, the substitute packet comprising: the reduced data packet; and a substitute header, the substitute header comprising: a connection identifier comprising an instruction to identify the communication session; and control information comprising instructions on coordinating a joint operation of the first switch and the end-user device; transmitting the substitute packet via Internet Protocol routing using the Internet Protocol address to the end-user device; and enabling the end-user device to: derive a connection identity from the connection identifier and control information in the substitute header; and process the substitute packet into a usable stream.

Technical Problem

Cellular radio links depend on scarce spectrum and pose bandwidth bottlenecks. To maximize efficient use of this resource, Voice Over Long-Term Evolution (VoLTE) applies Robust Header Compression (RoHC) to Internet Protocol packets on the radio link. Typically this compression reduces layer 2 and 3 headers to 3 bytes, but does not affect higher-level protocols. However, the compression and decompression operations impose processor loads in the radio base station and in the mobile or radio device. Those operations also introduce additional latency, which, for example, adversely affects the perceived sound quality of a voice connection.

The typical teaching in the prior art is that the "second switch" restores full headers to the payload before passing the packet to the end device. This results in significant consumption of bandwidth, large processing time, and increased latency in accessing networks.

Solution to Problem

The solution is a method to significantly reduce bandwidth on network access links such as the cellular radio access network, satellite hops, and lower-speed optical and electrical interfaces, without the processing loads.

At the same time, this invention provides the same advantages in packet forwarding and reduced latency in the access network that Multi-Protocol Label Switching provides in the core. Because the method disclosed uses the same label format in all devices, the Label Switched Path features in routers and switches operate normally.

The savings afforded by the method disclosed apply in both directions of transmission. The radio device, for example, prepares a payload to send by applying only a short path label and a connection identifier in a substitute header. There is no need for any headers containing Internet Protocol addresses.

Advantageous Effects of Invention

The method extends the Label Switched Path, previously restricted to the carrier's autonomous region, into the end device: smartphone, tablet, personal computer (PC), television (TV), media player, etc. This is particularly advantageous in cost and performance where the access bandwidth is limited or expensive.

The devices listed above today receive packet data in the Internet format: Internet Protocol header, then a Layer 3 header. Examples include a Transmission Control Protocol (TCP) or User Datagram Protocol (UDP), and possibly other headers. On local networks, almost all packets use an Ethernet header in addition to the others.

Drawing on the features of Software Defined Network (SDN), the method disclosed allows a central controller to set up a virtual circuit not only within the carrier network, but also throughout access facilities (radio, optical, or electrical) to the user device. This is advantageous because a central processor that calculates routing paths and sets up virtual circuits relieves the network routers and switches of running complex and processor-heavy protocols, such as Robust Header Compression and gateway routing protocols.

Label Switched Paths are controlled by the central processor so they normally cannot be changed by a user device. An application can request a connection, but the controller verifies the authority of the requester. The method is particularly advantageous in enhancing security because a device limited to connecting via Label Switched Paths can be guarded from intrusion and restricted in reach by policies applied in the central controller.

BRIEF DESCRIPTION OF DRAWINGS

The drawings illustrate preferred embodiments of the method of low-bandwidth data transport according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible to performance of the steps in any order not contradicted by the express requirements of the claimed steps. Thus, other embodiments may be utilized with operational changes in the order of steps, without departing from the scope of the present invention.

Figure 1:
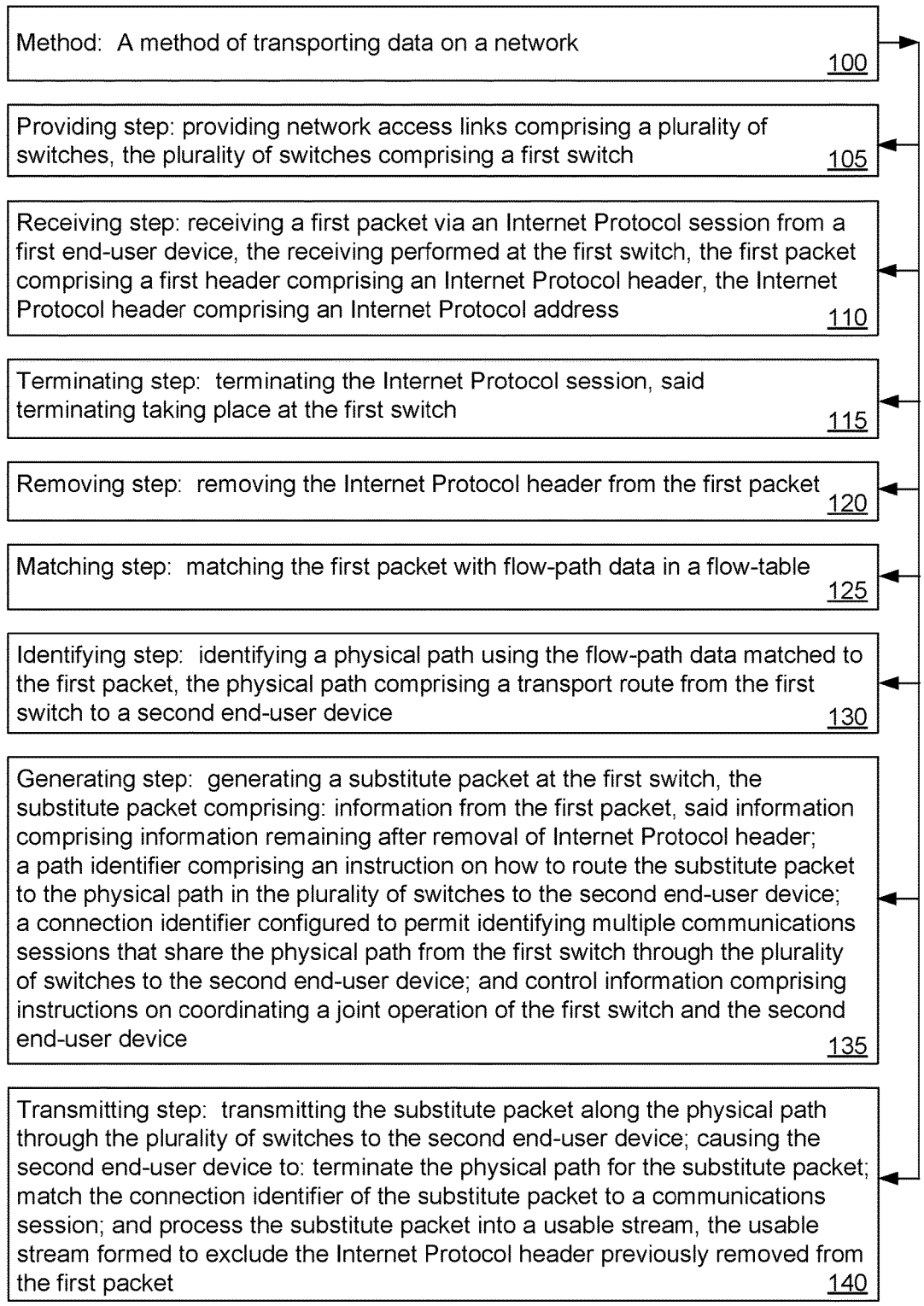
FIG. 1 is a block diagram of the steps in a preferred embodiment of the low-bandwidth data transport method.

FIG. 1 is a block diagram of the steps in a preferred embodiment of the low-bandwidth data transport process. Solid connecting lines between the blocks generally indicate required steps in the process. FIG. 1 shows a Method (100) of transporting data on a network. The transport may be in two directions, such as from a computer to a cell phone and back again. Thus, the transport may be in a first direction using network access links from a first switch to a second end-user device and in a second direction from a second end-user device to the first switch and to the first end-user device.

An end-user device is exemplified by a cell phone, a desktop computer, a tablet computer, a terminal, a switch, a router, or any other host. A host, as used in this application, includes any device having an IP address. For example, a host is most commonly a computer connected to the Internet. While there is some overlap in the listing of the components that constitute the end-user device, or infra, when discussing a "connected device," this overlap is not intended to imply a narrow definition of any such listed component. Rather, it is intended as an aid in understanding the scope the claimed invention.

The preferred method includes multiple steps identified as: a Providing step (105); a Receiving step (110); a Terminating step (115); a Removing step (120); a Matching step (125); an Identifying step (130); a Generating step (135); and a Transmitting step (140).

The Providing step (105) includes providing network access links comprising a plurality of switches. The plurality of switches includes a first switch. A network switch is also called a switching hub, a bridging hub, a router, and a MAC bridge. A network switch is a computer networking device that interconnects devices on a computer network by using packet switching to receive, process, and forward data to the destination device. The plurality of switches manages the flow of data across a network by transmitting a received network packet only to the one or more devices for which the packet is intended.

The Receiving step (110) includes receiving a first packet from a first end-user device via an Internet Protocol session. The Receiving step (110) is performed at the first switch by operations at the first switch. The first packet includes a first header. The first header includes an Internet Protocol header and other headers may be also be a part of the first header. The Internet Protocol header includes an Internet Protocol address. It is noted that there is typically a session associated with each header. Thus, an Internet Protocol header is received incident to an Internet Protocol session. It is the same with any other headers received during the Receiving step (110) or at other times in performance of the steps in the disclosed Method (100)

The Terminating step (115) includes terminating the Internet Protocol session. Preferably, the first switch implements the Terminating step (115).

The Removing step (120) includes removing the Internet Protocol header from the first packet. Preferably, the first switch implements the Removing step (120).

The Matching step (125) includes matching the first packet with flow-path data in a flow-table. Preferably, the first switch implements the Matching step (125).

The Identifying step (130) includes identifying a physical path using the flow-path data matched to the first packet, the physical path comprising a transport route from the first switch to the second end-user device. Preferably, the first switch implements the Identifying step (130).

The Generating step (135) includes generating a substitute packet at the first switch. The substitute packet is therefore created by operations at the first switch on the first packet received after the Receiving step (110).

The substitute packet includes information from the first packet that was not deleted from the first packet in the Removing step (120). Thus, the substitute packet includes information from the first packet that remains after removal of Internet Protocol header from the first packet.

The substitute packet further includes a path identifier comprising an instruction on how to route the substitute packet to the physical path in the plurality of switches to the end-user device.

The substitute packet further includes a connection identifier configured to permit identifying multiple communications sessions that share the physical path from the first switch through the plurality of switches to the end-user device.

The substitute packet further includes control information comprising instructions on coordinating a joint operation of the first switch and the end-user device.

The Transmitting step (140) includes transmitting the substitute packet, preferably in a frame that includes a Layer Two protocol, such as Ethernet, along the physical path through the plurality of switches to the second end-user device. Preferably, the first switch implements the Transmitting step (140).

The Transmitting step (140) further includes causing the end-user device to: terminate the physical path for the substitute packet. The instruction to the end-user device is preferably sent by the first switch. The Transmitting step (140) includes instructions for the end-user device to match the connection identifier of the substitute packet to a communications session. The Transmitting step (140) further includes an instruction for the end-user device to process the substitute packet into a usable stream. The usable stream is formed to exclude the Internet Protocol header previously removed from the first packet.

Figure 2:
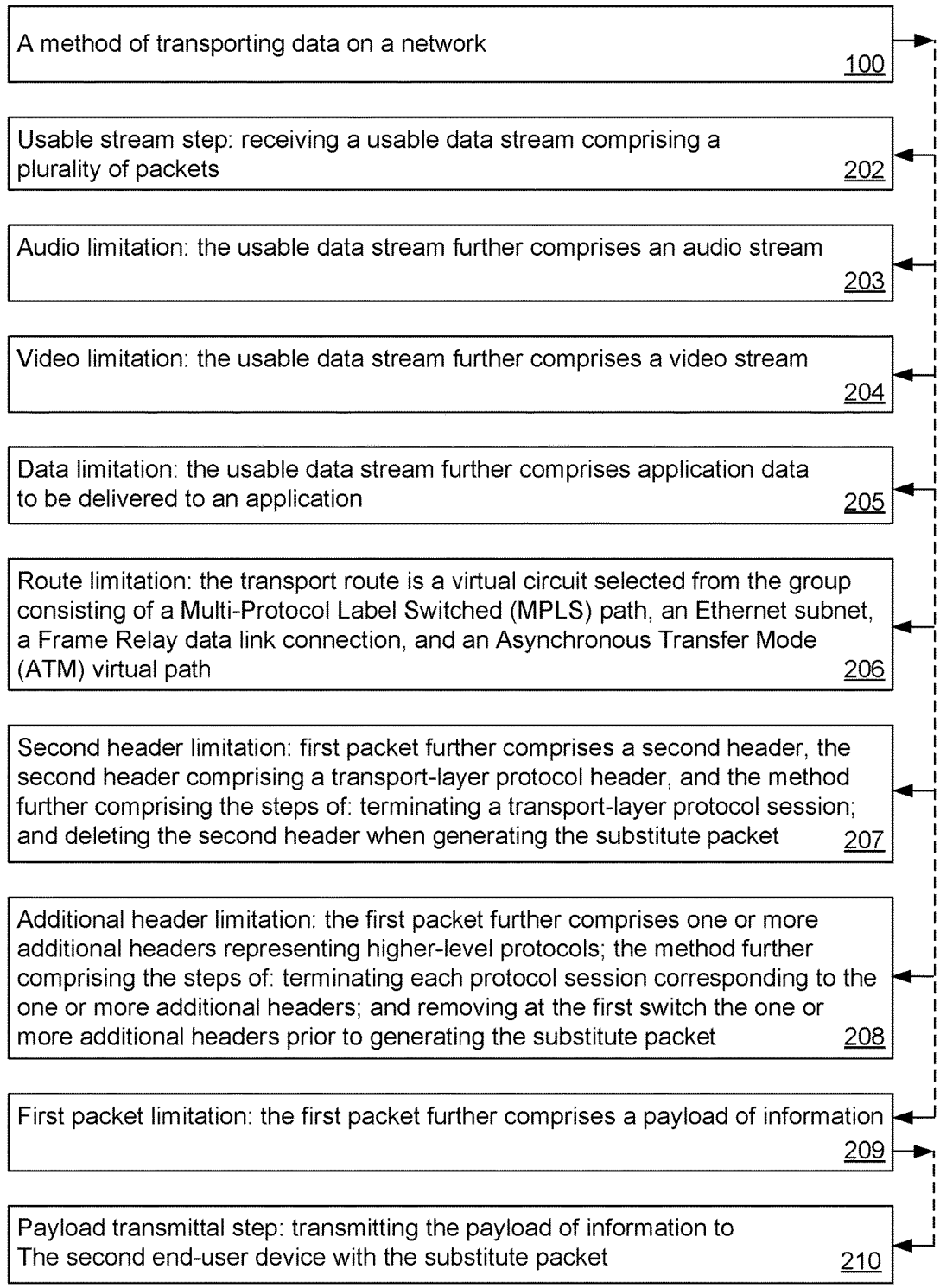
FIG. 2 is a block diagram of optional steps in the method.

FIG. 2 discloses additional optional steps and optional limitations on the steps disclosed in FIG. 1 that may be performed in the Method (100). Optional steps are generally indicated by a dashed line connecting the boxes. These optional steps and limitations include those identified as: a Usable stream step (202); an Audio limitation (203); a Video limitation (204); a Data limitation (205); a Route limitation (206); a Second header limitation (207); an Additional header limitation (208); a First packet limitation (209); a Payload transmittal step (210).

The Usable stream step (202) includes receiving a usable data stream comprising a plurality of packets. This step is preferably performed by the first switch.

The Audio limitation (203) requires that the usable data stream received in Usable stream step (202) include an audio stream.

The Video limitation (204) requires that the usable data stream received in Usable stream step (202) include a video stream.

The Data limitation (205) requires that the usable data stream received in Usable stream step (202) include application data to be delivered to an application.

The Route limitation (206) requires the transport route to be a virtual circuit selected from the group consisting of a Multi-Protocol Label Switched (MPLS) path, an Ethernet subnet, a Frame Relay data link connection, and an Asynchronous Transfer Mode (ATM) virtual path. Any virtual circuit technology may be used.

The Second header limitation (207) requires the first packet to include a second header. The second header includes a transport-layer protocol header. The Second header limitation (207) adds steps of terminating a transport-layer protocol session and deleting the second header when generating the substitute packet.

The Additional header limitation (208) requires that the first packet further include one or more additional headers representing higher-level protocols. The Additional header limitation (208) further includes the steps of terminating each protocol session corresponding to the one or more additional headers; and removing at the first switch the one or more additional headers prior to generating the substitute packet.

The First packet limitation (209) requires that the first packet include a payload of information. A payload of information may be any data, but is typically useful information, such as a digitized communications message.

The Payload transmittal step (210) adds a step of transmitting the payload of information to the second end-user device with the substitute packet.

Figure 3:
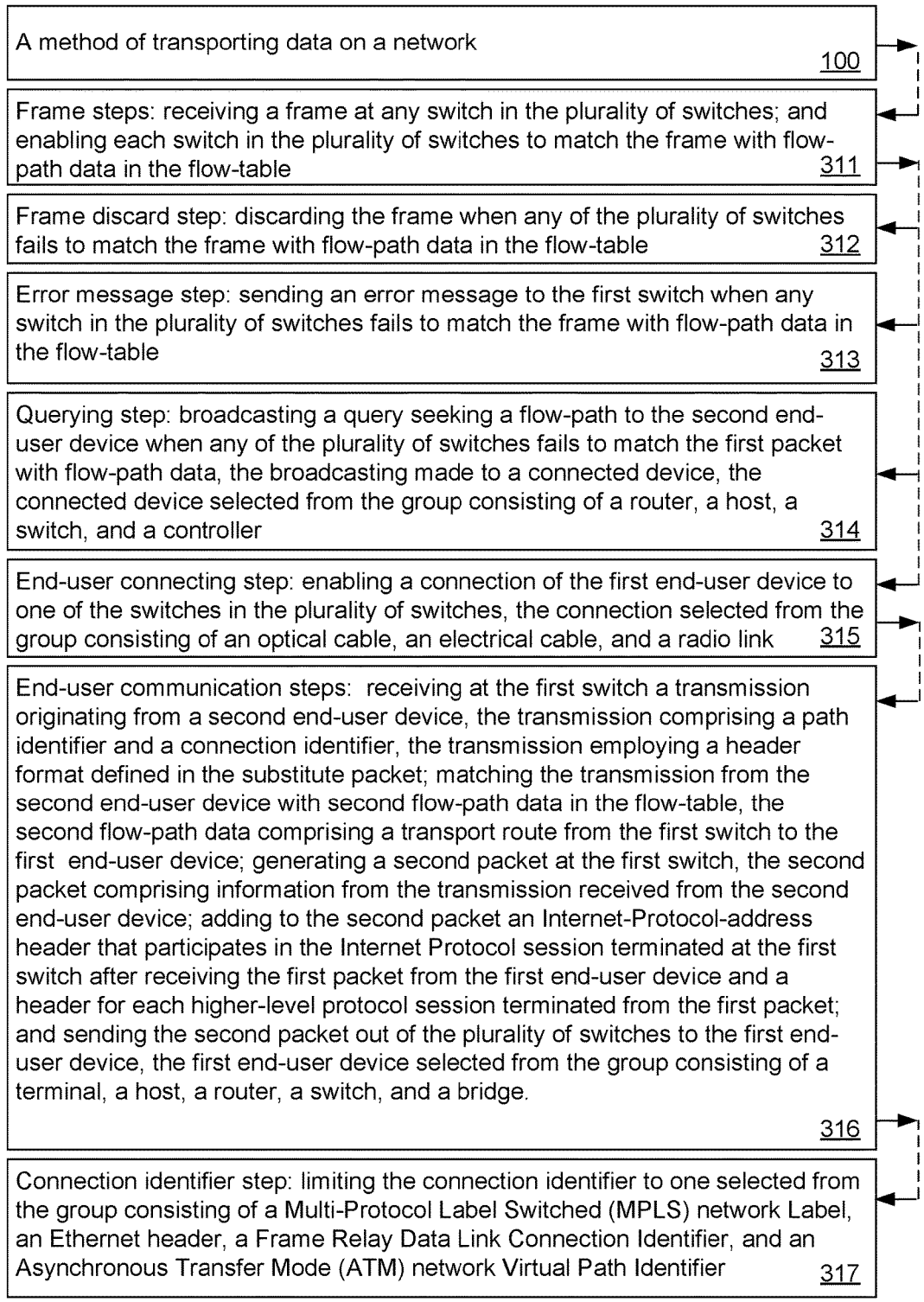
FIG. 3 is a block diagram of optional steps in the method.

FIG. 3 is a block diagram of additional optional steps to those disclosed in FIG. 1 that may be performed in the Method (100). Optional steps are generally indicated by a dashed line connecting the boxes. These additional steps are identified as: Frame steps (311); a Frame discard step (312); an Error message step (313); a Querying step (314); an End-user connecting step (315); End-user communication steps (316); and a Connection identifier step (317)

The Frame steps (311) include steps of: receiving a frame at any switch in the plurality of switches; and enabling each switch in the plurality of switches to match the frame with flow-path data in the flow-table.

The Frame discard step (312) adds a step to the Frame steps (311). The added step is discarding the frame when any of the plurality of switches fails to match the frame with flow-path data in the flow-table.

The Error message step (313) adds a step of sending an error message to the first switch when any switch in the plurality of switches fails to match the frame with flow-path data in the flow-table.

The Querying step (314) adds a step to the Frame steps (311). The added step is broadcasting a query seeking a flow-path to the end-user device when any of the plurality of switches fails to match the first packet with flow-path data. Broadcasting the query is made to a connected device. Preferably, the connected device is one of a router, a switch, and a controller.

The End-user connecting step (315) adds a step to the Frame steps (311). The added step is enabling a connection of the end-user device to one of the switches in the plurality of switches. Preferably, the connection is one of an optical cable, an electrical cable, and a radio link.

The End-user communication steps (316) adds steps to the End-user connecting step (315). The added steps define communication from the second end-user device to the first end-user device. The End-user communication steps (316) include: receiving at the first switch a transmission originating from a second end-user device, the transmission comprising a path identifier and a connection identifier, the transmission employing a header format defined in the substitute packet; matching the transmission from the second end-user device with second flow-path data in the flow-table, the second flow-path data comprising a transport route from the first switch to the first end-user device; generating a second packet at the first switch, the second packet comprising information from the transmission received from the second end-user device; adding to the second packet an Internet-Protocol-address header that participates in the Internet Protocol session terminated at the first switch after receiving the first packet from the first end-user device and a header for each higher-level protocol session terminated from the first packet; and sending the second packet out of the plurality of switches to the first end-user device, the first end-user device selected from the group consisting of a terminal, a host, a router, a switch, and a bridge. In one embodiment, the first switch does not include in the second packet a path identifier or a connection identifier, so the off-network end device, such as a first end-user device, does not have to deal with them.

The Connection identifier step (317) adds a step to the End-user communication steps (316). The added step includes the step of limiting the connection identifier to one selected from the group consisting of a Multi-Protocol Label Switched (MPLS) network Label, an Ethernet header, a Frame Relay Data Link Connection Identifier, and an Asynchronous Transfer Mode (ATM) network Virtual Path Identifier.

Figure 4:
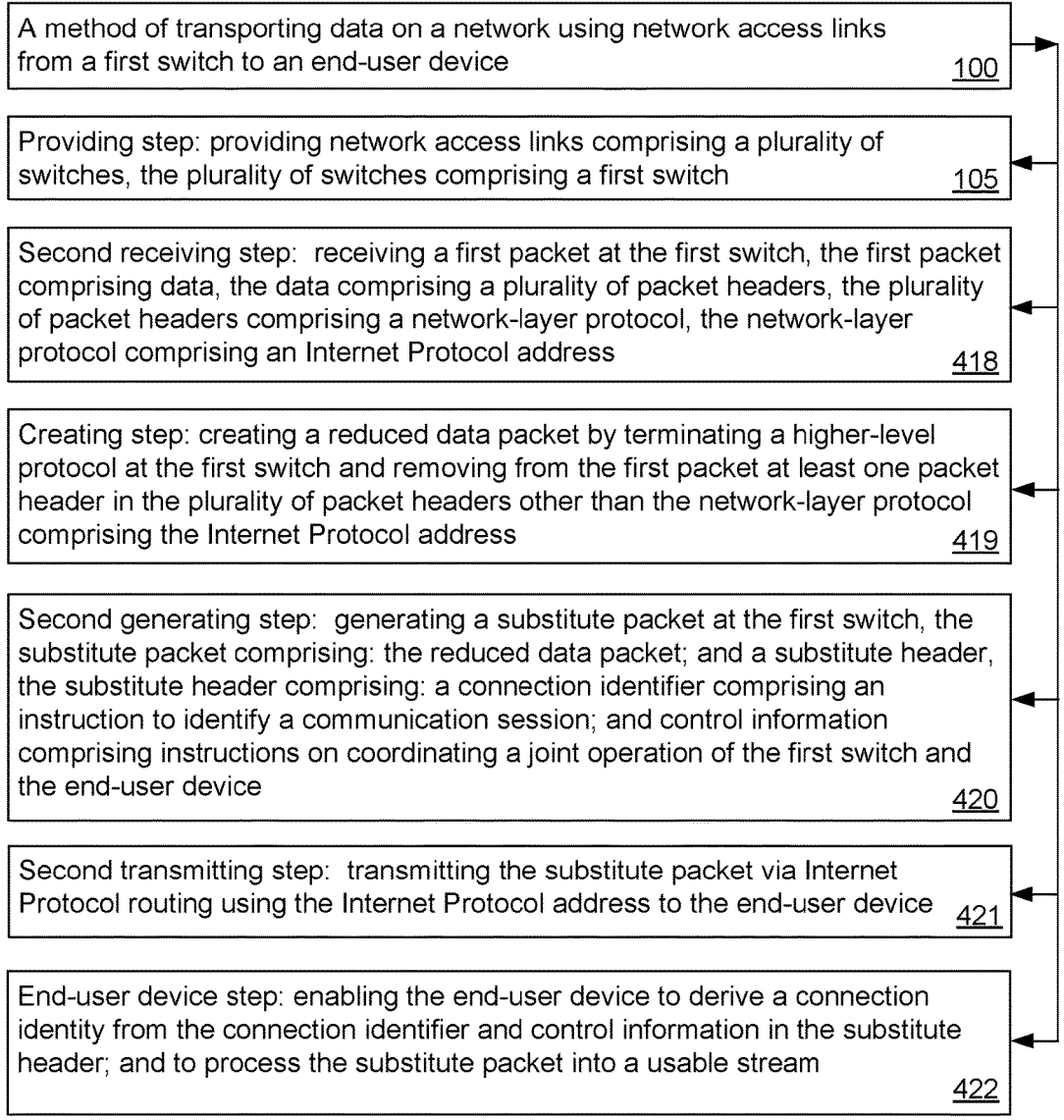
FIG. 4 is a block diagram of an alternative embodiment of the low-bandwidth data transport method.

FIG. 4 is a block diagram of an alternative embodiment of the Method (100). Solid connecting lines between the blocks generally indicate required steps in the process. This alternative embodiment includes steps identified as: a Providing step (105); a Second receiving step (418); a Creating step (419); a Second generating step (420); a Second transmitting step (421); and End-user device step (422).

The Providing step (105) is the same as with the embodiment described above as the preferred embodiment. The Providing step (105) is providing network access links comprising a plurality of switches, the plurality of switches comprising a first switch. The first switch is best exemplified in this alternative embodiment as a router.

The Second receiving step (418) includes a step of providing network access links including a plurality of switches. The plurality of switches includes a first switch.

The Creating step (419) includes a step of receiving a first packet at the first switch. The first packet includes data. Preferably, the data includes a plurality of packet headers. The plurality of packet headers include a network-layer protocol. The network-layer protocol includes a header for the Internet Protocol, which contains an Internet Protocol address.

The Second generating step (420) includes steps of: creating a reduced data packet by terminating a higher-level protocol at the first switch and removing from the first packet at least one packet header in the plurality of packet headers other than the network-layer protocol comprising the Internet Protocol address. For example, in a general use case, the first switch, when it generates the reduced data packet, will terminate a UDP session and remove a UDP header.

The Second generating step (420) includes a step of generating a substitute packet at the first switch. The substitute packet includes the reduced data packet; and a substitute header. The substitute header includes a connection identifier. The connection identifier contains an instruction to identify a communication session. The substitute header further includes control information having instructions on coordinating a joint operation of the first switch and the end-user device.

The Second transmitting step (421) further includes a step of transmitting the substitute packet via Internet Protocol routing using the Internet Protocol address to the end-user device.

The End-user device step (422) includes a step of enabling the end-user device to: derive a connection identity from the connection identifier and control information in the substitute header; and to process the substitute packet into a usable stream.

EXAMPLE

This example describes how a preferred exemplary method is implemented over a network that includes a controller; a first switch; a second switch; a base station containing a third switch, radio, and antenna; and a device that communicates by radio with the base station.

In this example, the first switch is configured to receive a frame encapsulating a first packet header and, optionally, a payload of information. The first switch is further configured to compare the frame to a flow table. The first switch is also configured to respond to finding no match in the flow table by sending the packet header to the controller.

In this example, the controller is configured to receive the packet header, compare the packet header to a data store that represents the topology of the network, use the values in the received header to compute a physical path from the first switch to the radio device, send a flow table entry to the first switch, send a flow table entry to the second switch, send a flow table entry to the switch at the radio base station, and send a flow table entry to the radio device.

In this example, the first switch is configured to: generate a substitute data based at least in part on the flow table entry received from the controller in response to the first packet header, and transmit the substitute data to the second switch. The first switch is further configured to: receive a second and subsequent packets identified by finding a match in the flow table and transmit the substitute data to the second switch immediately without additional instructions from the controller.

In this example, the second switch is configured to: receive the substitute data from the first switch and compare the substitute data to a flow table. Upon finding a match, the second switch is configured to forward the substitute data in the way indicated in the flow table to a third switch.

In this example, the third switch is configured to: receive substitute data and compare the substitute data to a flow table. When the flow table indicates forwarding to a radio device, the third switch sends the substitute data to the base station radio for transmission to the radio device.

In this example, the radio device is configured to: receive substitute data over the radio link, look up the substitute data in a flow table to determine how to handle the received data, and process that data into a usable stream. The radio device is further configured to transmit data to the base station. The radio device is further configured to determine via procedures with the base station when and how to transmit data. The radio device is further configured to send a request to the controller. This request may be sent via a configured Label Switched Path or via a connection service to a particular network address. The radio device is further configured to receive from the controller a signal and an entry in a flow table for that connection. The radio device is further configured to prepare payloads to send by adding a label received from the controller that is in the same form as the substitute data used by network switches to forward information along a virtual circuit.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the communications industry.

What is claimed is:

1. A method of transporting data on a network, the method comprising the steps of:
   providing network access links comprising a plurality of switches, the plurality of switches comprising a first switch;
   receiving a first packet via an Internet Protocol session from a first end-user device, the receiving performed at the first switch, the first packet comprising a first header comprising an Internet Protocol header, the Internet Protocol header comprising an Internet Protocol address;
   terminating the Internet Protocol session, said terminating taking place at the first switch;
   removing the Internet Protocol header from the first packet;
   matching the first packet with flow-path data in a flow-table;
   identifying a physical path using the flow-path data matched to the first packet, the physical path comprising a transport route from the first switch to a second end-user device;
   generating a substitute packet at the first switch, the substitute packet comprising:
      information from the first packet, said information comprising information remaining after removal of Internet Protocol header;
      a path identifier comprising an instruction on how to route the substitute packet to the physical path in the plurality of switches to the second end-user device;
      a connection identifier configured to permit identifying multiple communications sessions that share the physical path from the first switch through the plurality of switches to the second end-user device; and
      control information comprising instructions on coordinating a joint operation of the first switch and the second end-user device;
   transmitting the substitute packet along the physical path through the plurality of switches to the second end-user device;
   causing the second end-user device to:
      terminate the physical path for the substitute packet;
      match the connection identifier of the substitute packet to a communications session; and
      process the substitute packet into a usable stream, the usable stream formed to exclude the Internet Protocol header previously removed from the first packet.

2. The method of claim 1, further comprising the step of receiving a usable data stream comprising a plurality of packets.

3. The method of claim 2, wherein the usable data stream further comprises an audio stream.

4. The method of claim 2, wherein the usable data stream further comprises a video stream.

5. The method of claim 2, wherein the usable data stream further comprises application data to be delivered to an application.

6. The method of claim 1, wherein the transport route is a virtual circuit selected from the group consisting of a Multi-Protocol Label Switched (MPLS) path, an Ethernet subnet, a Frame Relay data link connection, and an Asynchronous Transfer Mode (ATM) virtual path.

7. The method of claim 1, wherein the first packet further comprises a second header, the second header comprising a transport-layer protocol header, and the method further comprising the steps of: terminating a transport-layer protocol session; and deleting the second header when generating the substitute packet.

8. The method of claim 1, wherein the first packet further comprises one or more additional headers representing higher-level protocols; the method further comprising the steps of:
  terminating each protocol session corresponding to the one or more additional headers; and
  removing at the first switch the one or more additional headers prior to generating the substitute packet.

9. The method of claim 1, wherein the first packet further comprises a payload of information.

10. The method of claim 9, further comprising the step of transmitting the payload of information to the second end-user device with the substitute packet.

11. The method of claim 1, further comprising the steps of: receiving a frame at any switch in the plurality of switches; and enabling each switch in the plurality of switches to match the frame with flow-path data in the flow-table.

12. The method of claim 11, further comprising the step of discarding the frame when any of the plurality of switches fails to match the frame with flow-path data in the flow-table.

13. The method of claim 11, further comprising the step of sending an error message to the first switch when any switch in the plurality of switches fails to match the frame with flow-path data in the flow-table.

14. The method of claim 11, further comprising the step of broadcasting a query seeking a flow-path to the second end-user device when any of the plurality of switches fails to match either the first packet or the substitute packet, with flow-path data, the broadcasting made to a connected device, the connected device selected from the group consisting of a router, a host, a switch, and a controller.

15. The method of claim 11, further comprising the step of enabling a connection of the second end-user device to one of the switches in the plurality of switches, the connection selected from the group consisting of an optical cable, an electrical cable, and a radio link.

16. The method of claim 15, further comprising the steps of:
  receiving at the first switch a transmission originating from a second end-user device, the transmission comprising a path identifier and a connection identifier, the transmission employing a header format defined in the substitute packet;
  matching the transmission from the second end-user device with second flow-path data in the flow-table, the second flow-path data comprising a transport route from the first switch to the first end-user device;
  generating a second packet at the first switch, the second packet comprising information from the transmission received from the second end-user device;
  adding to the second packet an Internet-Protocol-address header that participates in the Internet Protocol session terminated at the first switch after receiving the first packet from the first end-user device and a header for each higher-level protocol session terminated from the first packet; and
  sending the second packet out of the plurality of switches to the first end-user device, the first end-user device selected from the group consisting of a terminal, a host, a router, a switch, and a bridge.

17. The method of claim 16, further comprising the step of limiting the connection identifier to one selected from the group consisting of a Multi-Protocol Label Switched (MPLS) network Label, an Ethernet header, a Frame Relay Data Link Connection Identifier, and an Asynchronous Transfer Mode (ATM) network Virtual Path Identifier.

18. A method of transporting data on network access links from a first switch to an end-user device that is remote from the first switch, the method comprising the steps of:
  providing network access links comprising a plurality of switches, the plurality of switches comprising a first switch;
  receiving a first packet at the first switch, the first packet comprising data, the data comprising a plurality of packet headers, the plurality of packet headers comprising a network-layer protocol, the network-layer protocol comprising an Internet Protocol address;
  creating a reduced data packet by terminating a higher-level protocol at the first switch and removing from the first packet at least one packet header in the plurality of packet headers other than the network-layer protocol comprising the Internet Protocol address;
  generating a substitute packet at the first switch, the substitute packet comprising:
    the reduced data packet; and
    a substitute header, the substitute header comprising: a connection identifier comprising an instruction to identify a communication session; and control information comprising instructions on coordinating a joint operation of the first switch and the end-user device;
  transmitting the substitute packet via Internet Protocol routing using the Internet Protocol address to the end-user device; and
  enabling the end-user device to:
    derive a connection identity from the connection identifier and control information in the substitute header; and
    process the substitute packet into a usable stream.

* * * * *